US012334594B2

(12) United States Patent
Lee

(10) Patent No.: US 12,334,594 B2
(45) Date of Patent: Jun. 17, 2025

(54) BATTERY MODULE HAVING RAIL TYPE SOCKET AND BATTERY PACK INCLUDING THE SAME

(71) Applicant: LG ENERGY SOLUTION, LTD., Seoul (KR)

(72) Inventor: Chang Hui Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 558 days.

(21) Appl. No.: 17/793,353

(22) PCT Filed: Dec. 28, 2020

(86) PCT No.: PCT/KR2020/019190
§ 371 (c)(1),
(2) Date: Jul. 15, 2022

(87) PCT Pub. No.: WO2021/162238
PCT Pub. Date: Aug. 19, 2021

(65) Prior Publication Data
US 2023/0034195 A1 Feb. 2, 2023

(30) Foreign Application Priority Data
Feb. 13, 2020 (KR) .................. 10-2020-0017410

(51) Int. Cl.
*H01M 50/509* (2021.01)
*H01M 50/213* (2021.01)
(Continued)

(52) U.S. Cl.
CPC ....... *H01M 50/509* (2021.01); *H01M 50/213* (2021.01); *H01M 50/503* (2021.01); *H01M 50/507* (2021.01); *H01M 50/559* (2021.01)

(58) Field of Classification Search
CPC ............. H01M 50/213; H01M 50/503; H01M 50/509; H01M 50/502; H01M 50/505;
(Continued)

(56) References Cited

U.S. PATENT DOCUMENTS 9,947,912 B2   4/2018  Nakamura et al.
2005/0079408 A1* 4/2005 Hirano ................ H01M 10/613
                                                    429/174
(Continued)

FOREIGN PATENT DOCUMENTS

CN       102272979 A     12/2011
CN       102473871 A      5/2012
(Continued)

OTHER PUBLICATIONS

Office Action issued in corresponding Taiwanese Patent Application No. 110101867, dated Sep. 2, 2024.
(Continued)

*Primary Examiner* — Imran Akram
(74) *Attorney, Agent, or Firm* — Morgan, Lewis & Bockius LLP

(57) ABSTRACT

A battery module includes a plurality of battery cell assemblies. Each of battery cell assemblies includes two or more cylindrical battery cells connected to each other in parallel, and the plurality of battery cell assemblies are connected to each other in series. Each battery cell assembly having the parallel connection structure is configured such that negative electrodes of the two or more cylindrical battery cells are electrically connected to each other via a rail type socket. The series connection between the battery cell assemblies includes an electrical connection between the rail type socket and positive electrodes of battery cells of an adjacent battery cell assembly via connection members.

11 Claims, 8 Drawing Sheets

(51) Int. Cl.
*H01M 50/503* (2021.01)
*H01M 50/507* (2021.01)
*H01M 50/559* (2021.01)

(58) Field of Classification Search
CPC .. H01M 50/507; H01M 50/51; H01M 50/528; H01M 50/56
See application file for complete search history.

(56) References Cited

U.S. PATENT DOCUMENTS

| | | | |
|---|---|---|---|
| 2009/0297892 A1* | 12/2009 | Ijaz | H01M 10/643 219/121.64 |
| 2010/0266880 A1* | 10/2010 | Hirakawa | H01M 50/213 429/53 |
| 2011/0052957 A1 | 3/2011 | Ohta | |
| 2011/0171504 A1 | 7/2011 | Yasui et al. | |
| 2011/0195284 A1* | 8/2011 | Yasui | H01M 50/227 429/82 |
| 2012/0100401 A1 | 4/2012 | Yasui et al. | |
| 2012/0164490 A1 | 6/2012 | Itoi et al. | |
| 2013/0136975 A1* | 5/2013 | Uchida | H01M 50/291 429/159 |
| 2013/0236769 A1 | 9/2013 | Bang et al. | |
| 2014/0045038 A1 | 2/2014 | Kimura et al. | |
| 2014/0113167 A1 | 4/2014 | Itoi et al. | |
| 2015/0072211 A1 | 3/2015 | Nakamura et al. | |
| 2015/0140369 A1 | 5/2015 | Itoi et al. | |
| 2015/0270517 A1 | 9/2015 | Yasui et al. | |
| 2017/0047572 A1 | 2/2017 | Biskup et al. | |
| 2018/0108886 A1 | 4/2018 | Fees et al. | |
| 2018/0108901 A1 | 4/2018 | Fees et al. | |
| 2019/0109313 A1 | 4/2019 | Ryu et al. | |
| 2020/0028132 A1 | 1/2020 | Muratsu et al. | |
| 2020/0127249 A1 | 4/2020 | Yoon et al. | |
| 2021/0074987 A1 | 3/2021 | Kim | |
| 2021/0143504 A1 | 5/2021 | Muratsu et al. | |

FOREIGN PATENT DOCUMENTS

| | | |
|---|---|---|
| CN | 102473884 A | 5/2012 |
| CN | 103534834 A | 1/2014 |
| CN | 104425785 A | 3/2015 |
| CN | 106450135 A | 2/2017 |
| CN | 108780863 A | 11/2018 |
| CN | 110024165 A | 7/2019 |
| EP | 2339668 A1 | 6/2011 |
| EP | 3131161 A1 | 2/2017 |
| JP | 2009-272160 A | 11/2009 |
| JP | 2010-225337 A | 10/2010 |
| JP | 2011-065906 A | 3/2011 |
| JP | 2015-053205 A | 3/2015 |
| JP | 2015-201290 A | 11/2015 |
| JP | 5885718 B2 | 3/2016 |
| JP | 2019-515448 A | 6/2019 |
| KR | 2012-0025097 A | 3/2012 |
| KR | 2013-0133855 A | 12/2013 |
| KR | 2018-0093330 A | 8/2018 |
| KR | 2018-0129115 A | 12/2018 |
| KR | 2019-0078094 A | 7/2019 |
| KR | 2019-0106541 A | 9/2019 |
| KR | 2019-0136202 A | 12/2019 |
| WO | 2018/155158 A1 | 8/2018 |

OTHER PUBLICATIONS

Office Action issued in corresponding Chinese Patent Application No. 202080079335.0, dated Sep. 29, 2024.
International Search Report (with partial translation) and Written Opinion dated Apr. 8, 2021 issued in corresponding International Patent Application No. PCT/KR2020/019190.
Office Action issued in corresponding Chinese Patent Application No. 202080079335.0, dated Jun. 14, 2024. (Note: KR 2018-0129115 A was previously cited).
Office Action dated Sep. 28, 2023, issued in corresponding Chinese Patent Application No. 202080079335.0.
Extended European Search Report dated Oct. 5, 2023, issued in corresponding European Patent Application No. 20919292.1.
Office Action dated Jul. 3, 2023, issued in corresponding Japanese Patent Application No. 2022-528280.

* cited by examiner

[FIG. 1]
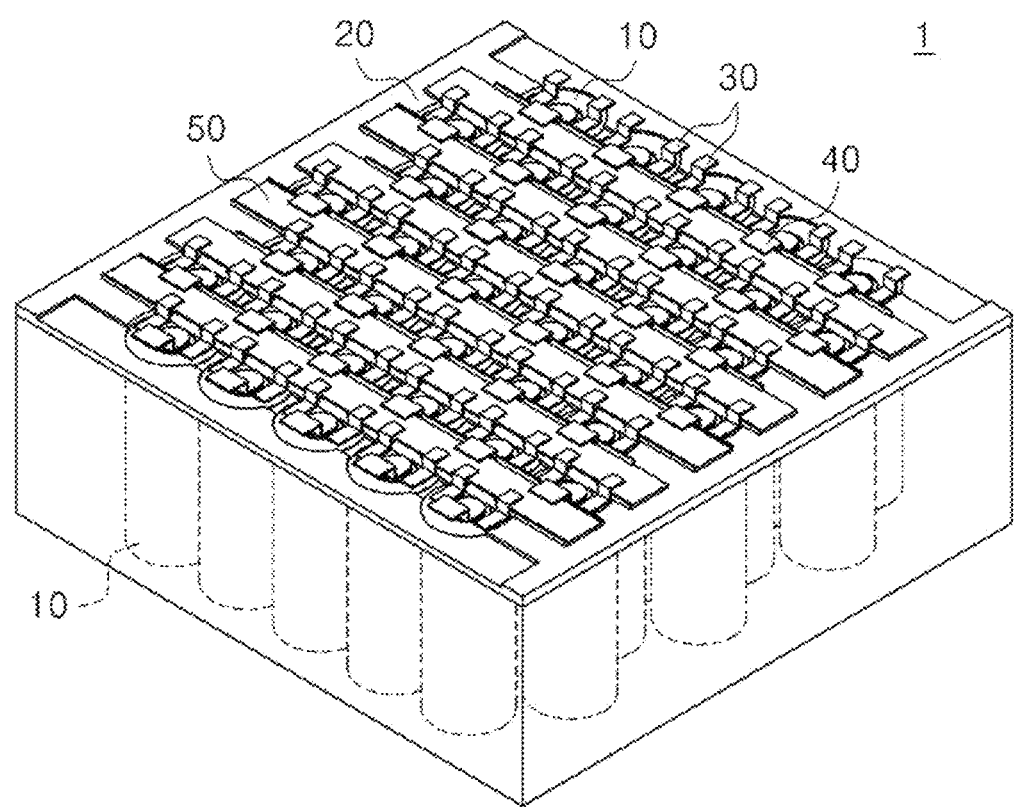

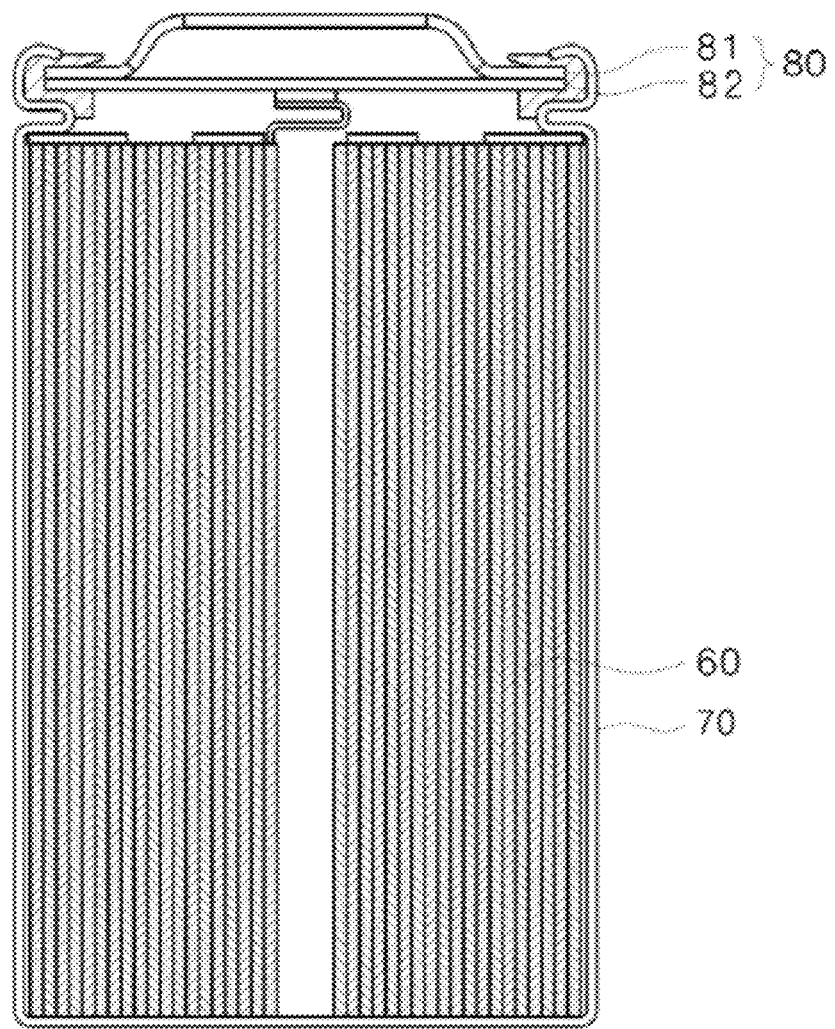
[FIG. 2]

[FIG. 3]
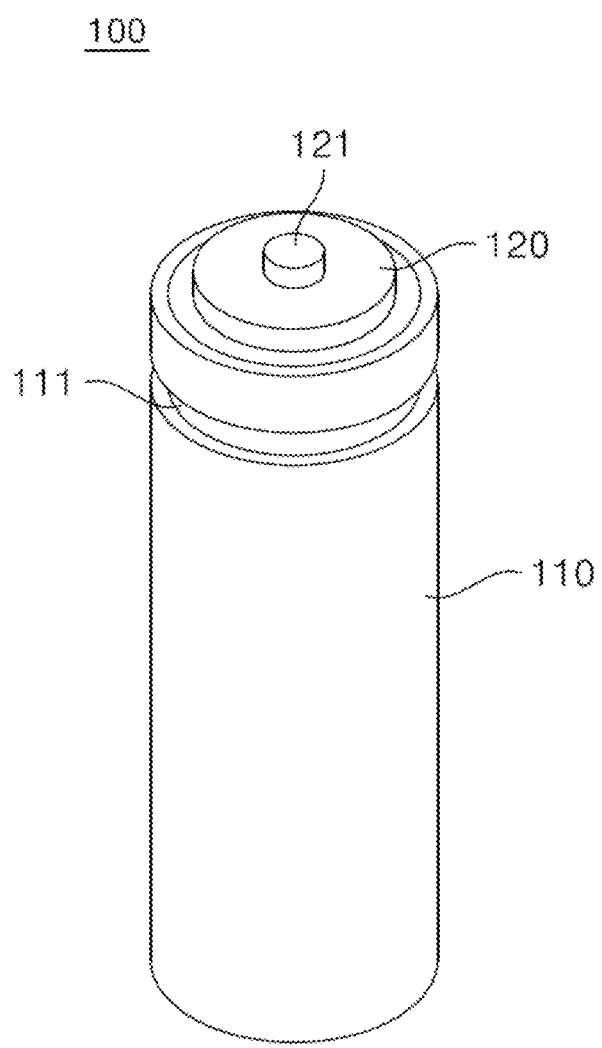

[FIG. 4]
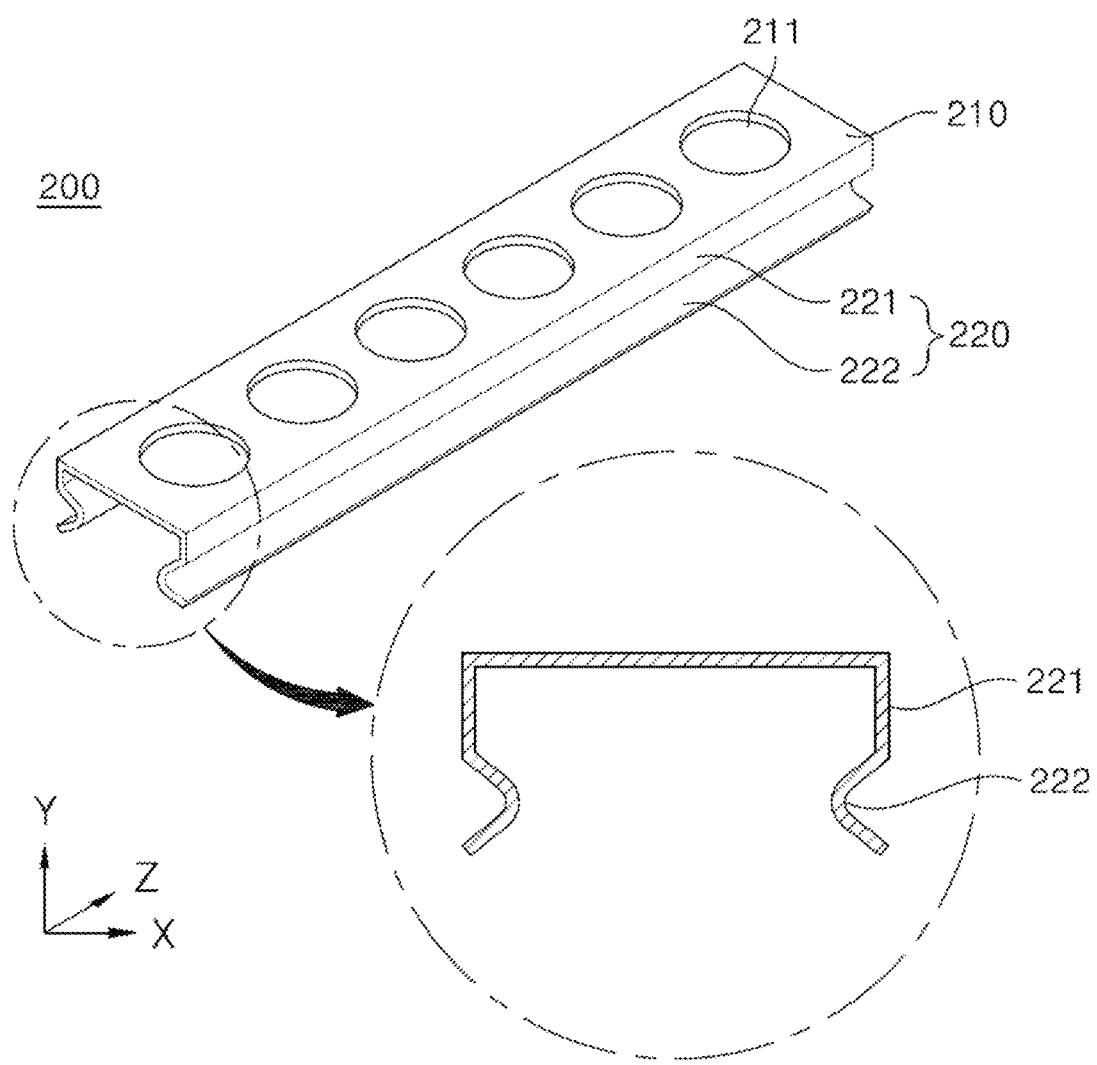

[FIG. 5]
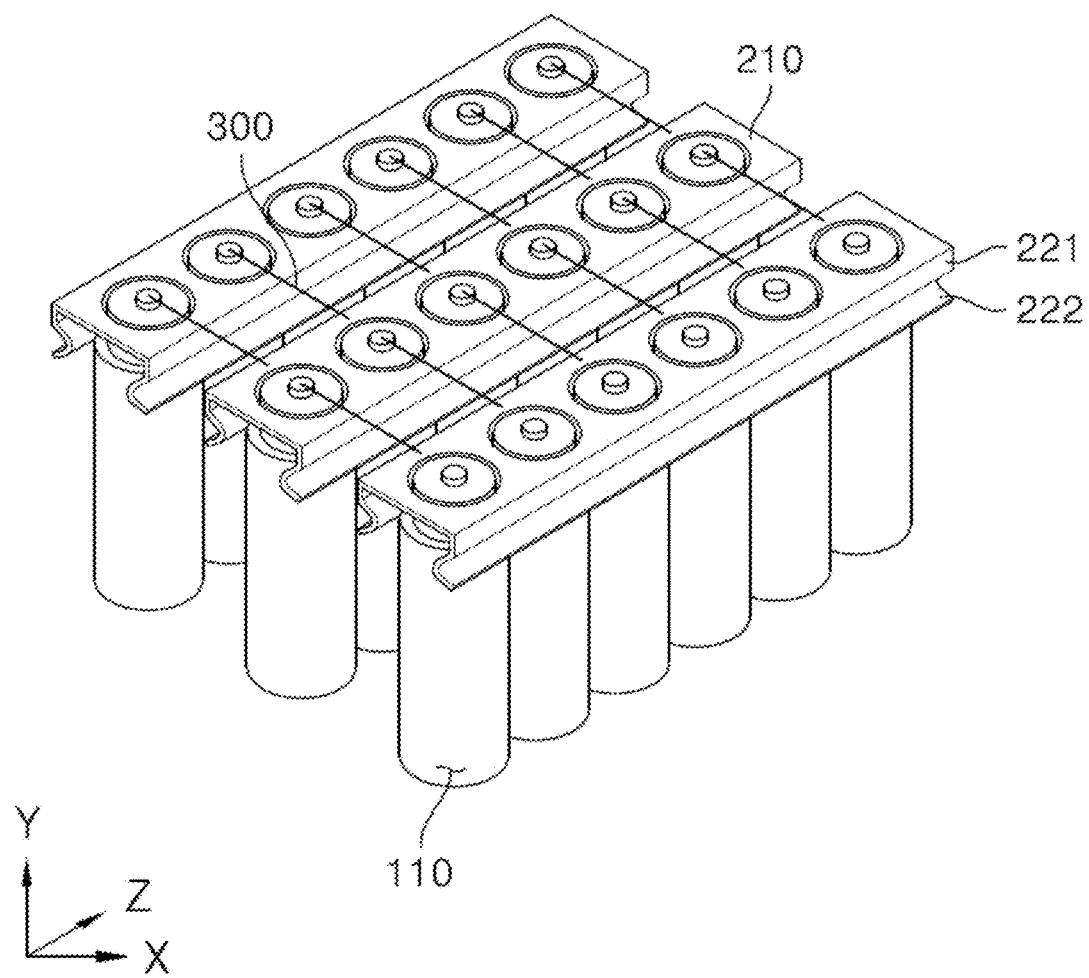

[FIG. 6]
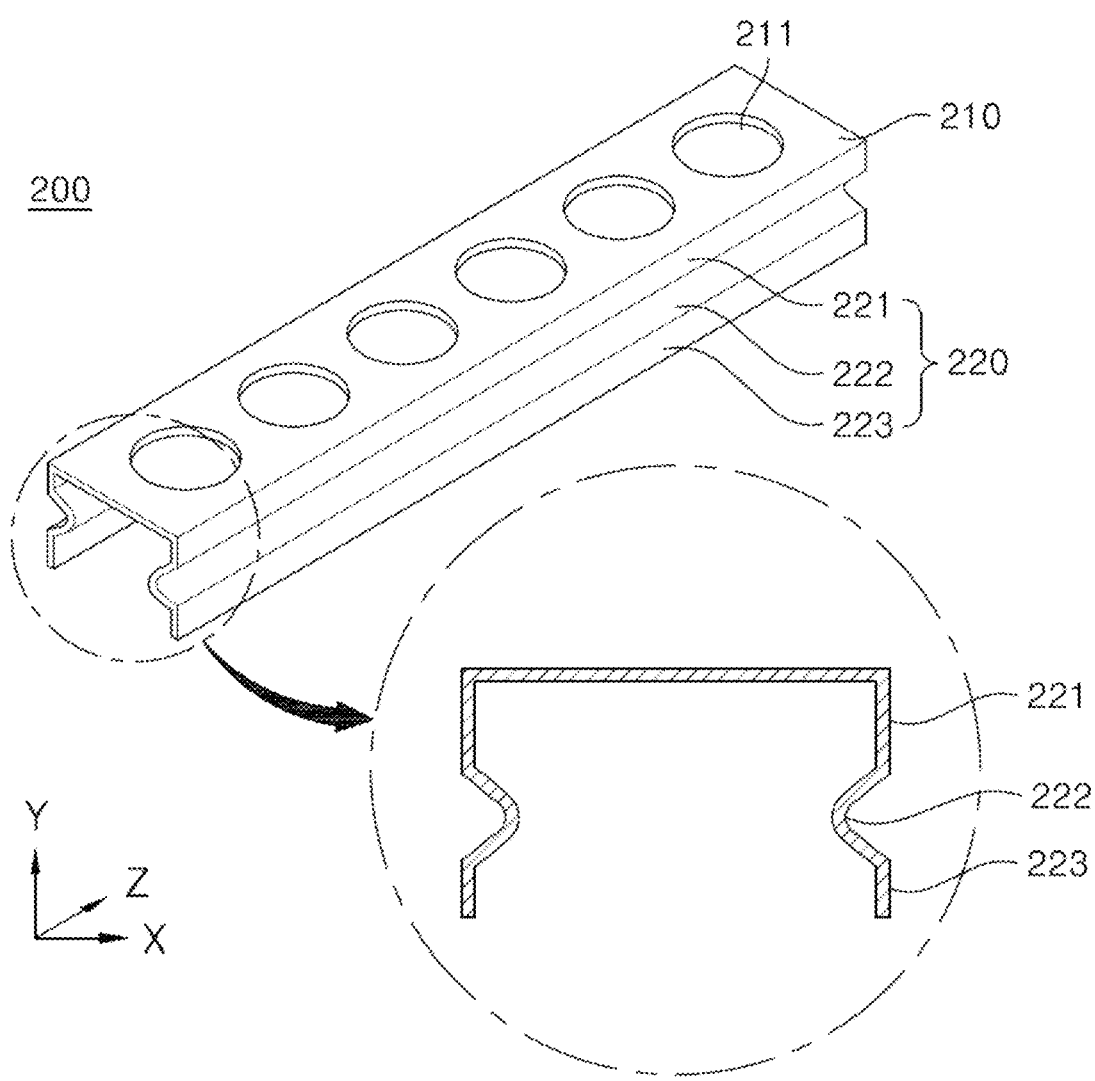

[FIG. 7]
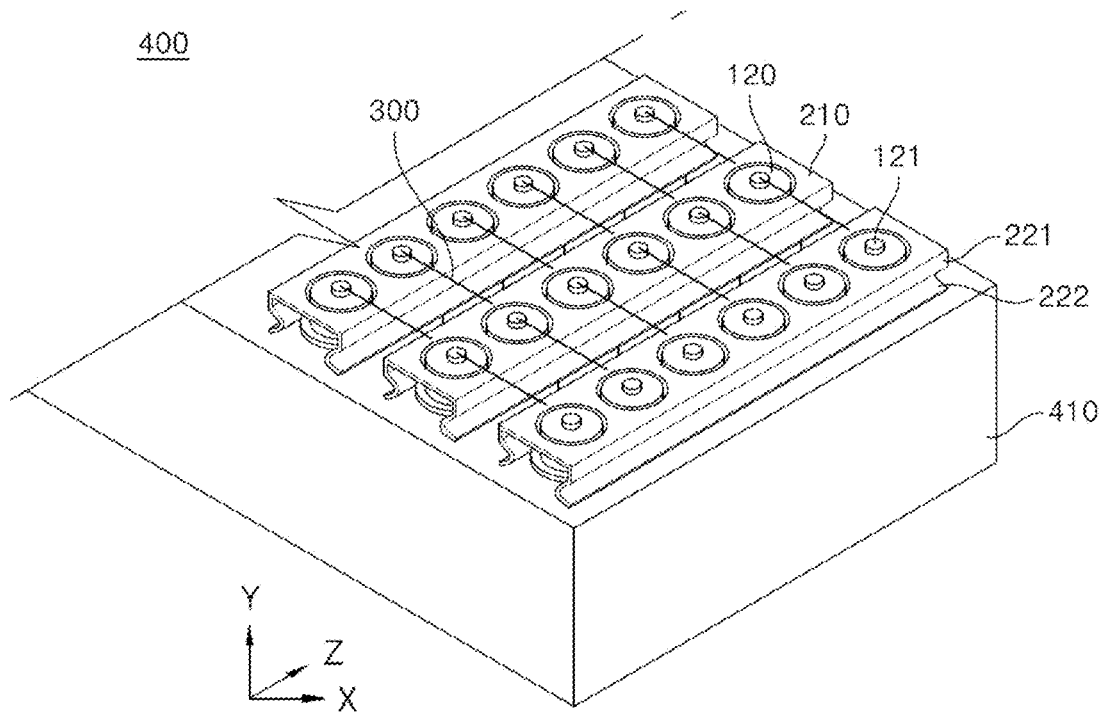

[FIG. 8]
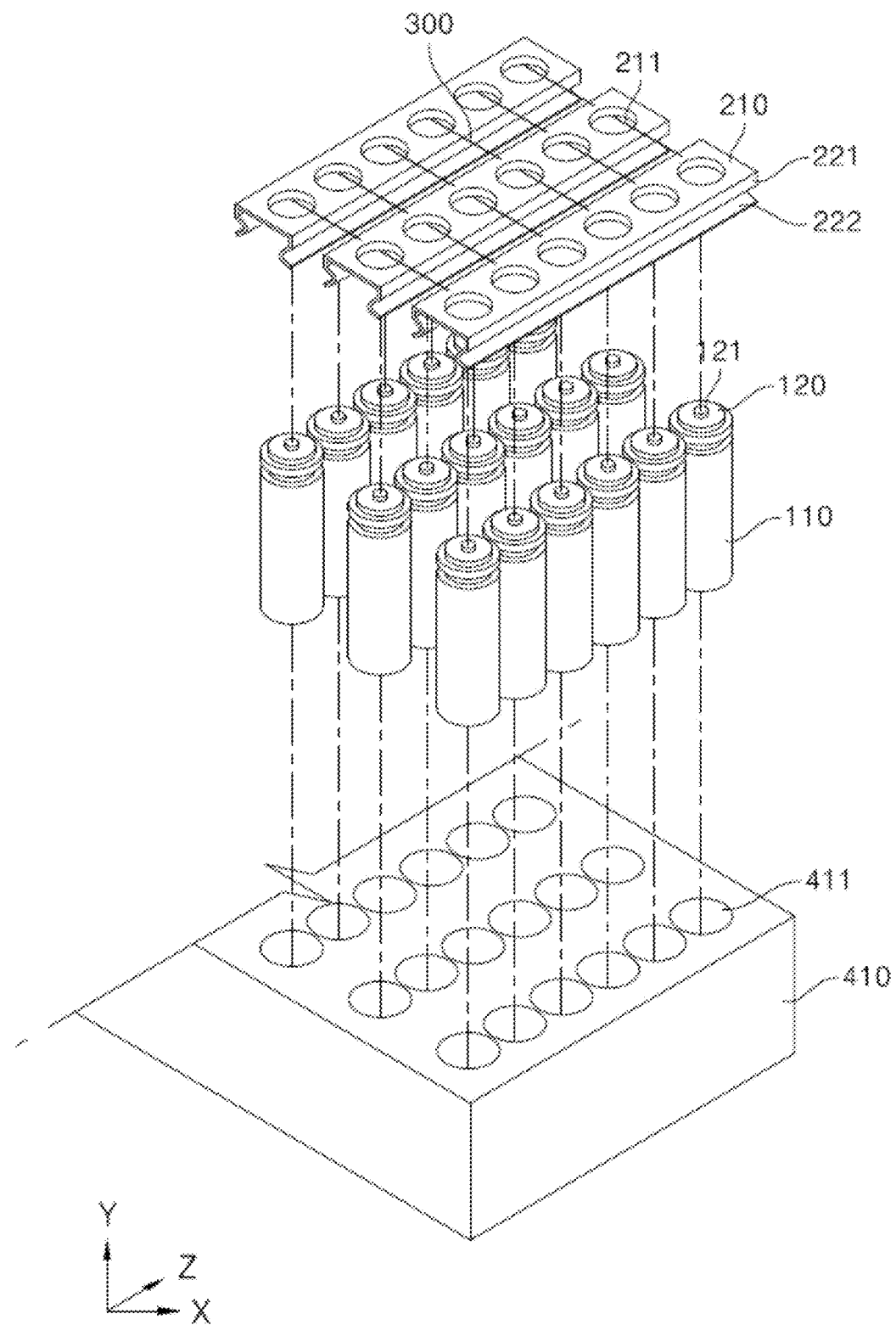

BATTERY MODULE HAVING RAIL TYPE SOCKET AND BATTERY PACK INCLUDING THE SAME

TECHNICAL FIELD

This application claims the benefit of priority to Korean Patent Application No. 2020-0017410 filed on Feb. 13, 2020, the disclosure of which is incorporated herein by reference in its entirety.

The present invention relates to a battery module having a rail type socket and a battery pack including the same, and more particularly to a battery module having a rail type socket configured such that a plurality of battery cells is connected to each other in parallel using a rail type socket to constitute a single battery cell assembly and such that battery cell assemblies are connected to each other in series using connection members, thereby contributing to reduction in material cost and shortening of production time, and a battery pack including the same.

BACKGROUND ART

With technological development of mobile devices, such as mobile phones, laptop computers, camcorders, and digital cameras, and an increase in the demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

Meanwhile, when used in a device requiring large capacity and high voltage, such as an electric vehicle, the secondary battery described above is used in the form of a battery cell assembly or a battery pack having a structure in which a plurality of battery cells is arranged.

FIG. 1 is a perspective view of a battery pack including conventional cylindrical battery cells, and FIG. 2 is a vertical sectional view of a conventional cylindrical battery cell.

Referring to FIGS. 1 and 2, a battery module 1 includes a cell frame 20 open such that electrodes of secondary battery cells 10 are exposed outside, a negative electrode connection member 30 and a positive electrode connection member 40 joined respectively to negative electrode and positive electrode terminals formed at one side of each of the cylindrical secondary battery cells 10, and a separable cylindrical cell connection busbar 50 having one side joined to the negative electrode connection member 30 and the other side joined to the positive electrode connection member 40.

Each of the cylindrical secondary battery cells 10 includes a battery case 70 configured to receive a jelly-roll type electrode assembly 60 and a cap assembly 80 located at the upper part of the battery case 70, and has a structure in which a top cap 81 is located at the upper end of the cap assembly 80 and in which a venting member 82 configured to interrupt current at high temperature, a safety vent configured to discharge high-pressure gas, and a current interrupt device configured to interrupt current when pressure in the battery increases are sequentially stacked at the lower part of the top cap 81.

Conventionally, as described above, many conductors are used to connect a plurality of battery cells to each other in series and/or in parallel, and a plastic-based insulative frame is used since it is necessary to separate the conductors from positive electrodes and negative electrodes of the battery cells. Furthermore, a fixing adhesive is used and hardened in order to fix the conductors to the insulative frame, whereby production cost and production time are increased.

In connection therewith, Korean Patent Application Publication No. 2018-0129115 discloses a battery module configured such that a plurality of openings corresponding to external appearances of secondary battery cells is formed in a cell frame, the openings of the cell frame are open such that electrodes of the secondary battery cells are exposed outside, the cylindrical secondary battery cells received in the cell frame are connected to each other in parallel in row directions thereof by a negative electrode connection member, a positive electrode connection member, and a busbar, and rows of the cylindrical secondary battery cells are connected to each other in series.

According to the above prior art document, the open cell frame, the positive electrode connection member, and the negative electrode connection member are used. Even when the secondary battery cells have different heights, therefore, the extent of tight contact between the secondary batteries and the busbar is increased, whereby it is possible to reduce a defect rate at the time of laser welding and to reduce production time, and therefore it is possible to achieve mass production.

In the above prior art document, however, subsidiary materials, such as a fixing adhesive and an insulative frame, are still used, whereby high cost is incurred. In addition, hardening time is long, and therefore manufacturing time is still long.

PRIOR ART DOCUMENTS (Patent Document 1) Korean Patent Application Publication No. 2018-0129115
(Patent Document 2) Korean Patent Application Publication No. 2019-0136202

DISCLOSURE

Technical Problem

The present invention has been made in view of the above problems, and it is an object of the present invention to provide a battery module having a rail type socket capable of connecting cylindrical battery cells to each other in series and in parallel, whereby it is possible to minimize the number of materials used to manufacture a battery module and to shorten manufacturing time, and a battery pack including the same.

Technical Solution

In order to accomplish the above object, the present invention provides a battery module including a plurality of battery cell assemblies, each of which is constituted by connecting two or more cylindrical battery cells (100) to each other in parallel, the plurality of battery cell assemblies being connected to each other in series, wherein each battery cell assembly having the parallel connection structure is configured such that negative electrodes of the two or more cylindrical battery cells (100) are electrically connected to each other via a rail type socket (200), and the series connection between the battery cell assemblies is performed through electrical connection between the rail type socket (200) and positive electrodes of battery cells (100) constituting an adjacent battery cell assembly via connection members (300).

In the battery module according to the present invention, each of the connection members (300) may be a wire made of a conductive material or a plate having a predetermined width.

In the battery module according to the present invention, each of the cylindrical battery cells (100) may include a cell case (110) having a lower surface and a side surface applied as a negative electrode and a positive electrode terminal (121) formed at a center of an upper surface of the cell case so as to protrude by a predetermined height, and a recessed portion (111) inwardly depressed by a predetermined depth may be formed at a predetermined position of the side surface.

In the battery module according to the present invention, the rail type socket (200) may include an upper part (210) having a predetermined width and length, the upper part being provided with a plurality of through-holes (211), and a pair of side parts (220) extending downwards from the upper part (210).

In the battery module according to the present invention, each of the side parts (220) may include a first extension portion (221) configured to be brought into tight contact with the side surfaces of the battery cells (100) and a bent portion (222) configured to be seated in the recessed portions (111) of the battery cells (100) in the state in which one side thereof is connected to the first extension portion (221).

In the battery module according to the present invention, each of the side parts (220) may include a first extension portion (221) configured to be brought into tight contact with the side surfaces of the battery cells (100), a bent portion (222) configured to be seated in the recessed portions (111) of the battery cells (100) in the state in which one side thereof is connected to the first extension portion (221), and a second extension portion (223) configured to be brought into tight contact with the side surfaces of the battery cells (100) in a state in which one side thereof is connected to the bent portion (222), wherein the first extension portion, the bent portion, and the second extension portion are sequentially provided.

In the battery module according to the present invention, the section of the bent portion (222) may have a shape identical to the shape of the section of the recessed portion (111) of each of the battery cells (100).

In the battery module according to the present invention, the inner diameter of each of the through-holes (211) may be greater than the outer diameter of a top cap (120).

In the battery module according to the present invention, the positive electrode terminal (121) may extend through a corresponding one of the through-holes (211) in the upper part (210) so as to protrude by a predetermined height.

In the battery module according to the present invention, the edge of the upper surface of the cell case (110) may be brought into tight contact with the lower surface of the upper part (210) of the rail type socket (200).

In the battery module according to the present invention, the rail type socket (200) may include a nickel material, and each of the connection members (300) may include an aluminum material.

In addition, the present invention provides a battery pack including the battery module described above and a pack case (410) having a plurality of receiving holes (411) formed therein and configured to receive the cell cases (110).

In addition, the present invention provides a device including the battery pack described above.

Effects of the Invention

In a battery module having a rail type socket according to the present invention and a battery pack including the same, it is possible to connect a plurality of cylindrical battery cells to each other in parallel using a single rail type socket, whereby it is possible to minimize the use of materials and to shorten assembly time.

Also, in the battery module having the rail type socket according to the present invention and the battery pack including the same, battery cells of battery cell assemblies, each of which has the parallel connection structure formed by the rail type socket, are directly connected to rail type sockets, whereby it is possible to obtain a battery module having a series connection structure. As a result, an insulator and an adhesive are not necessary, whereby it is possible to reduce production cost and production time.

Furthermore, in the battery module having the rail type socket according to the present invention and the battery pack including the same, a bent portion of the rail type socket is brought into tight contact with recessed portions of the battery cells, whereby it is possible to more stably support the battery cells.

DESCRIPTION OF DRAWINGS

FIG. 1 is a perspective view of a battery pack including conventional cylindrical battery cells.

FIG. 2 is a vertical sectional view of a conventional cylindrical battery cell.

FIG. 3 is a perspective view of a battery cell according to a first preferred embodiment of the present invention.

FIG. 4 is a perspective view of a rail type socket according to a first preferred embodiment of the present invention.

FIG. 5 is a perspective view of a battery module in which the battery cells and the rail type sockets according to the first preferred embodiment of the present invention are coupled to each other.

FIG. 6 is a perspective view of a rail type socket according to a second preferred embodiment of the present invention.

FIG. 7 is a perspective view of a battery pack according to a first preferred embodiment of the present invention.

FIG. 8 is an exploded perspective view of the battery pack shown in FIG. 7.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having a rail type socket according to the present invention and a battery pack including the same will be described.

FIG. 3 is a perspective view of a battery cell according to a first preferred embodiment of the present invention. Referring to FIG. 3, the cylindrical battery cell according to the present invention includes a cell case 110 configured to receive an electrode assembly (not shown), the cell case being electrically connected to a negative electrode lead of the electrode assembly, and a top cap 120 located at the upper part of the cell case 110.

A recessed portion 111 depressed inwardly is formed at a predetermined position of the upper part of the side surface of the cell case 110, and a bent portion of a rail type socket is seated in the recessed portion 111. A detailed description related thereto will be described below.

The top cap 120 is not electrically conducted to the cell case 110 due to an insulation member (not shown), and is electrically connected to a positive electrode lead of the electrode assembly, whereby the top cap serves as a positive electrode terminal.

The upper surface of the cell case 110 is located along the outer circumference of the top cap 120 in the state in which the insulation member is interposed between the cell case and the top cap such that the cell case 110 and the top cap 120 are fixed to each other. It is preferable that the top cap 120 protrude beyond the upper surface of the cell case 110, and it is more preferable that a positive electrode terminal 121 elevated upwards be further provided at the center of the top cap 120. The reason for this is that, in connecting a plurality of battery cells 100 in series and in parallel, it is possible to easily mount rail type sockets according to the present invention and furthermore to reliably prevent different electrodes from being connected to each other.

Meanwhile, the electrode assembly includes a cell assembly and leads. The cell assembly may be a jelly-roll type cell assembly, which is configured to have a structure in which a long sheet type positive electrode and a long sheet type negative electrode are wound in the state in which a separator is interposed between the positive electrode and the negative electrode, a stacked type cell assembly including unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which the unit cells are stacked in the state in which a separator is interposed therebetween and are then attached to each other. However, the present invention is not limited thereto.

In a pair of leads including a positive electrode lead and a negative electrode lead, the positive electrode lead is directly and indirectly connected to the positive electrode of the cell assembly and to the top cap, and the negative electrode lead is electrically connected to the cell case. The electrode assembly constituting the cylindrical battery cell described above corresponds to generally known constructions, and therefore a more detailed description thereof will be omitted.

FIG. 4 is a perspective view of a rail type socket according to a first preferred embodiment of the present invention, and FIG. 5 is a perspective view of a battery module in which the battery cells and the rail type sockets according to the first preferred embodiment of the present invention are coupled to each other.

First, the rail type socket 200 according to the present invention is configured to connect a plurality of cylindrical battery cells 100 aligned side by side to each other in parallel in order to constitute a single first battery cell assembly.

Specifically, the rail type socket 200 includes an upper part 210 and side parts 220. The upper part 210 may be a thin flat plate having a predetermined thickness and length. For example, the width (X-axis direction) of the upper part 210 may be equal or similar to the outer diameter of the cell case 110, and the length (Z-axis direction) of the upper part may be equal or similar to the total length of battery cells 100 to be connected to each other in parallel.

The bottom surface of the upper part 210 of the rail type socket 200 may be located so as to be spaced apart from the upper surface of the cell case 110 by a predetermined distance. For reliable fixation and electrical connection, however, it is more preferable that the bottom surface of the upper part of the rail type socket be in tight contact with the edge of the upper surface of the cell case 110 corresponding to the negative electrode terminal.

A plurality of through-holes 211 each having a predetermined inner diameter, specifically an inner diameter greater than the outer diameter of the top cap 120, is formed in the upper part 210. Each of the through-holes 211 is configured to expose the top cap 120 outwards in order to prevent the occurrence of short circuit due to contact between the upper part 210 and the top cap 120 when the rail type socket 200 is seated on the upper part of the cell case 110.

A pair of side parts 220 extends downwards from the upper part 210, and is configured to connect a plurality of cylindrical battery cells 100 located adjacent to each other in parallel and at the same time to fix and support the cylindrical battery cells.

As an example, each of the side parts 220 may include a first extension portion 221 configured to be brought into tight contact with the side surfaces of the battery cells 100 and a bent portion 222 configured to be seated in the recessed portions 111 of the battery cells 100 in the state in which one side thereof is connected to the first extension portion 221. In this case, it is possible to securely fix the battery cells 100.

Here, it is more preferable that the recessed portion 111 of each of the battery cells 100 and the bent portion 222 have the same external appearance in order to prevent separation between the bent portion and the recessed portion when the bent portion 222 is seated in the recessed portion 111.

Meanwhile, the rail type socket 200, which serves as a negative electrode, may include a nickel material. However, the material for the rail type socket is not particularly restricted as long as the material can be used for a negative electrode.

Subsequently, first battery cell assemblies, each of which has a parallel connection structure formed by the rail type socket 200 described above, are connected to each other in series.

As an example, as shown in FIG. 5, six cylindrical battery cells 100 may be connected to each other by a single rail type socket 200 to constitute a battery cell assembly, and three battery cell assemblies may be connected to each other in series.

Series connection between the battery cell assemblies will be described in detail. A connection member 300 made of a conductive material is located between the top cap 120 or the positive electrode terminal 121 protruding above each of the through-holes 211 of one rail type socket 200 and the rail type socket 200, more specifically the upper part 210, of another battery cell assembly adjacent thereto in order to connect the battery cell assemblies to each other.

Here, the connection member 300 is preferably a wire or a plate having a predetermined width. It is more preferable that connection members 300 be provided in numbers corresponding to the number of the battery cells 100 such that the top caps 120 or the positive electrode terminals 121 of the battery cells 100 can be connected to each individual rail type socket 200. The reason for this is that it is necessary to prevent excessive resistance generated due to a decrease in surface area of each of the connection members 300.

Meanwhile, the connection member 300, which serves as a positive electrode, may include an aluminum material. However, the material for the connection member is not particularly restricted as long as the material can be used for a positive electrode.

FIG. 6 is a perspective view of a rail type socket according to a second preferred embodiment of the present invention. The second embodiment of the present invention is identical in construction to the first embodiment of the present invention except that a second extension portion 223 is further provided at each of the side parts 220 of the rail type socket 200, and therefore a description will only be given of the second extension portion 223.

Each of the side parts 220 of the rail type socket according to the second embodiment of the present invention includes a first extension portion 221 configured to be brought into tight contact with the side surfaces of the battery cells 100, a bent portion 222 configured to be seated in the recessed portions 111 of the battery cells 100 in the state in which one side thereof is connected to the first extension portion 221, and a second extension portion 223 configured to be brought into tight contact with the side surfaces of the battery cells 100 in the state in which one side thereof is connected to the bent portion 222. The first extension portion, the bent portion, and the second extension portion are sequentially provided.

In the case in which the second extension portion 223 having a predetermined height (Y-axis direction) is further provided at each of the side parts 220 of the rail type socket, it is possible to more reliably fix the battery cells 100.

FIG. 7 is a perspective view of a battery pack according to a first preferred embodiment of the present invention, and FIG. 8 is an exploded perspective view of the battery pack shown in FIG. 7.

The battery pack according to the present invention may have the battery module having the above construction received in a pack case 410.

As an example, a plurality of receiving holes 411 configured to receive the cell cases 110 is formed in the pack case 410. Even when external impact is applied, therefore, it is possible to inhibit movement of the battery cells 100, whereby it is possible to stably supply electricity.

The battery pack may be mounted in a device. Concrete examples of the device may include a vehicle, a mobile phone, and a laptop computer. Such a device has various complicated functions and thus requires a lot of electrical energy. A battery pack capable of providing high capacity and high voltage is mounted in a device to supply power to the device.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Battery cell
110: Cell case
111: Recessed portion
120: Top cap
121: Positive electrode terminal
200: Rail type socket
210: Upper part
211: Through-hole
220: Side part
221: First extension portion 222: Bent portion
223: Second extension portion
300: Connection member
400: Battery pack
410: Pack case
411: Receiving hole

The invention claimed is:

1. A battery module comprising a plurality of battery cell assemblies, each of the battery cell assemblies including two or more cylindrical battery cells connected to each other in parallel, and the plurality of battery cell assemblies being connected to each other in series,
   wherein each battery cell assembly having the parallel connection structure is configured such that negative electrodes of the two or more cylindrical battery cells are electrically connected to each other via a rail type socket,
   wherein the series connection between the battery cell assemblies includes an electrical connection between the rail type socket and positive electrodes of battery cells of an adjacent battery cell assembly via connection members,
   wherein each of the cylindrical battery cells comprises a cell case having a lower surface and a side surface as a negative electrode and a positive electrode terminal at a center of an upper surface of the cell case so as to protrude by a predetermined height,
   wherein a recessed portion inwardly depressed by a predetermined depth is at a predetermined position of the side surface, and
   wherein the rail type socket comprises a pair of side parts comprising a first extension portion configured to be brought into tight contact with the side surfaces of the battery cells and a bent portion configured to be seated in the recessed portions of the battery cells in a state in which one side thereof is connected to the first extension portion.

2. The battery module according to claim 1, wherein each of the connection members includes a wire of a conductive material or a plate having a predetermined width.

3. The battery module according to claim 1, wherein the rail type socket further comprises an upper part having a predetermined width and length, the upper part being provided with a plurality of through-holes, and the pair of side parts extend downwards from the upper part.

4. The battery module according to claim 3, wherein each of the side parts further comprises a second extension portion configured to be in direct contact with the side surfaces of the battery cells in a state in which one side thereof is connected to the bent portion, the first extension portion, the bent portion, and the second extension portion being sequentially provided.

5. The battery module according to claim 1, wherein a section of the bent portion has a shape identical to a shape of a section of the recessed portion of each of the battery cells.

6. The battery module according to claim 1, wherein an inner diameter of each of the through-holes is greater than an outer diameter of a top cap.

7. The battery module according to claim 6, wherein the positive electrode terminal extends through a corresponding one of the through-holes in the upper part so as to protrude by a predetermined height.

8. The battery module according to claim 6, wherein an edge of the upper surface of the cell case is in direct contact with a lower surface of the upper part of the rail type socket.

9. The battery module according to claim 1, wherein the rail type socket comprises a nickel material, and each of the connection members comprises an aluminum material.

10. A battery pack comprising:
   the battery module according to claim 1; and
   a pack case having a plurality of receiving holes therein and configured to receive the cell cases.

11. A device having the battery pack according to claim 10.

* * * * *